Figure 1:
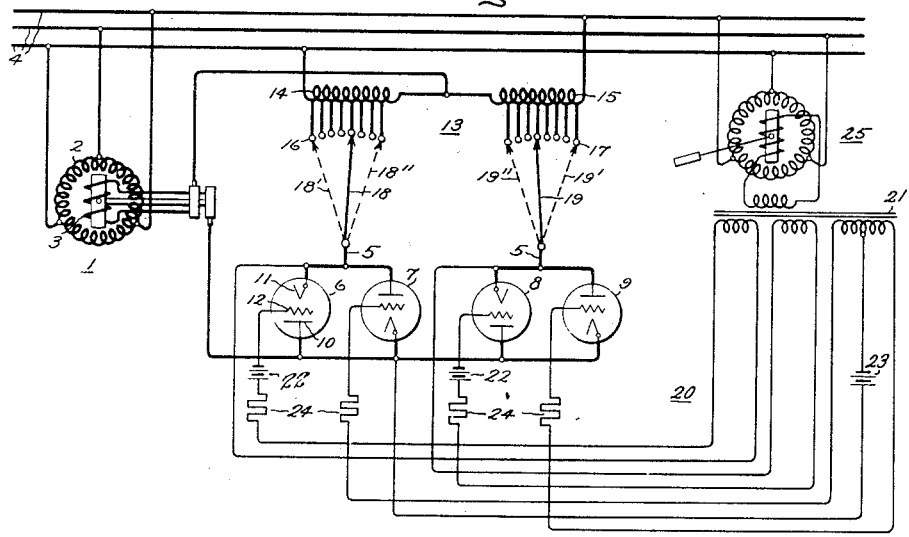

June 2, 1942.   E. F. W. ALEXANDERSON   2,285,182
ELECTRIC MOTOR CONTROL SYSTEM
Original Filed Oct. 19, 1937   3 Sheets-Sheet 1

Inventor:
Ernst F. W. Alexanderson,
by Harry E. Dunham
His Attorney.

Patented June 2, 1942

2,285,182

UNITED STATES PATENT OFFICE 2,285,182

ELECTRIC MOTOR CONTROL SYSTEM

Ernst F. W. Alexanderson, Schenectady, N. Y., assignor to General Electric Company, a corporation of New York Original application October 19, 1937, Serial No. 169,844. Divided and this application November 14, 1940, Serial No. 365,688

4 Claims. (Cl. 172—274)

My invention relates to electric valve apparatus and more particularly to electric valve circuits for controlling dynamo-electric machines.

This application is a division of my copending patent application Serial No. 169,844, filed October 19, 1937, and which matured into United States Letters Patent No. 2,236,984 on April 1, 1941, and which is assigned to the assignee of this application.

Numerous electric valve arrangements have been provided heretofore to control the speed of dynamo-electric machines. For example, electric valve arrangements have been associated with alternating current motors of the induction type to control the speed of the induction motors. In some of these arrangements the control of the speed has been obtained by varying the conductivities of the electric valves to effect the desired control of the amount and direction of power transfer between an induced winding of the motor and an associated alternating current circuit. When such speed controlling arrangements are used, it becomes important to maintain the power factor of the motor within a predetermined reasonable range of values in order that an inordinately low power factor condition is not imposed on the associated alternating current supply circuit.

It is an object of my invention to provide a new and improved electric valve circuit.

It is another object of my invention to provide a new and improved electric valve circuit for controlling dynamo-electric machines.

It is a further object of my invention to provide a new and improved electric valve control circuit for an induction motor.

It is a still further object of my invention to provide a new and improved electric valve circuit for controlling the speed of an induction motor and which includes means for independently controlling the power factor of the induction motor.

In accordance with the illustrated embodiments of my invention, I provide a new and improved electric valve system for controlling an operating condition such as the speed of an induction motor. An inducing winding of the induction motor is connected to an alternating current supply circuit. A second alternating current circuit is connected to an induced winding of the induction motor through electric valve means. More particularly, suitable voltage controlling apparatus such as a mechanically coupled dynamo-electric machine of the synchronous type is employed to control the amount of power transferred from the wound rotor of the induction motor and an associated alternating current circuit. Electric valve apparatus is connected between the rotor or secondary winding of the induction motor and the armature winding of the synchronous dynamo-electric machine.

Figure 2:
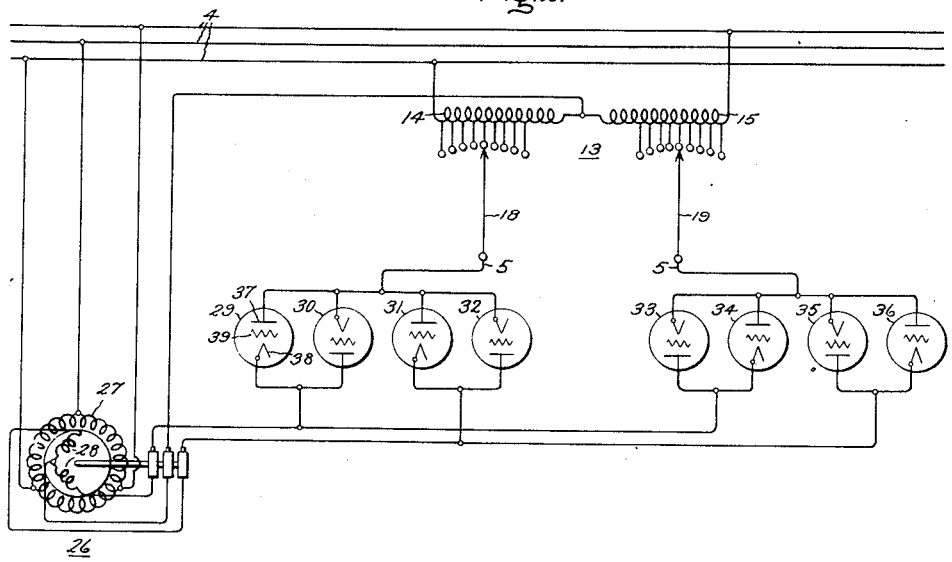
Figure 3:
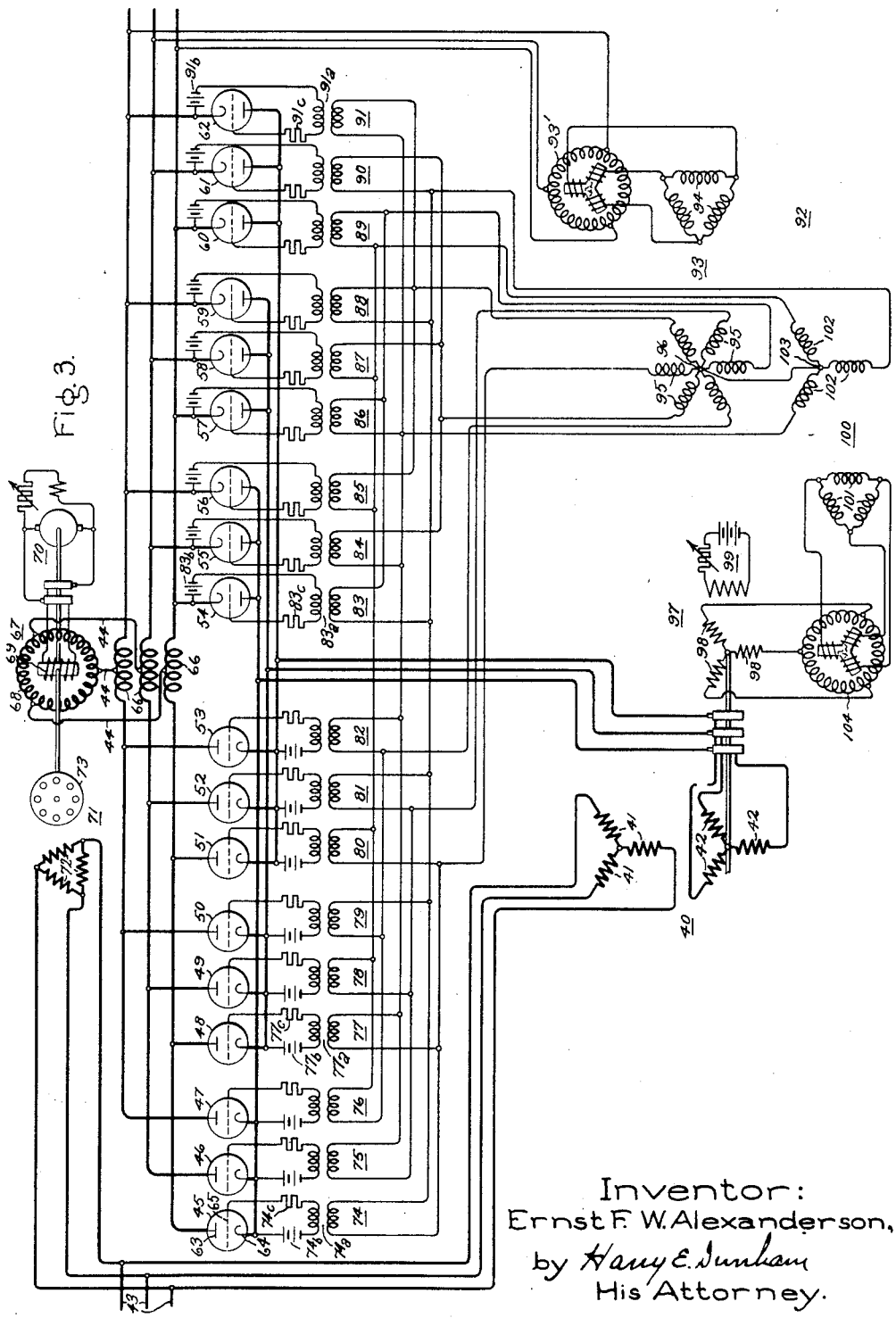
Figure 4:
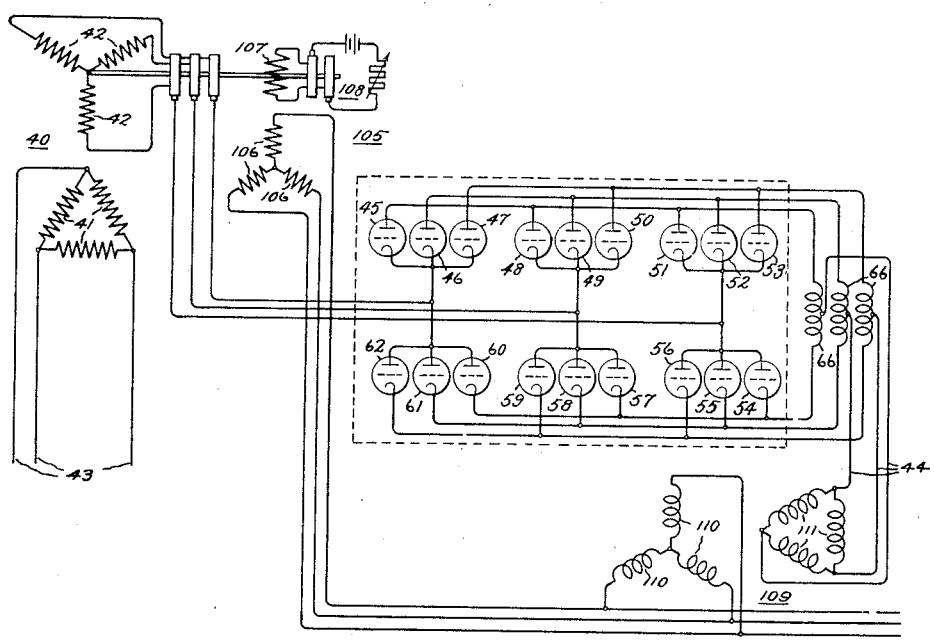

For a better understanding of my invention, reference may be had to the following description taken in connection with the accompanying drawings and its scope will be pointed out in the appended claims. Fig. 1 of the accompanying drawings diagrammatically illustrates an embodiment of my invention as applied to an electric valve control system for an induction motor having a single phase rotor winding; and Fig. 2 diagrammatically illustrates an embodiment as applied to an induction motor having a quarter phase rotor winding. Fig. 3 diagrammatically illustrates another embodiment of my invention as applied to an electric valve control system for an induction motor and in which an auxiliary motor-generator set is employed to control the speed of the induction motor. Fig. 4 represents a still further embodiment wherein an auxiliary alternating current machine is mechanically coupled to the induction motor to be controlled to control the speed of the induction motor through the cooperation of an associated electric valve means.

Referring now to Fig. 1 of the accompanying drawings, my invention is diagrammatically illustrated as applied to a control system for an induction motor 1 having an inducing or stator winding 2 and an induced or rotor winding 3. While for the purpose of illustration I have chosen to show the rotor winding 3 as being of the single phase type, it is to be understood that it may be of the polyphase type. Stator winding 2 is connected to an alternating current supply circuit 4. I provide a variable voltage alternating current circuit 5 which transmits power from the rotor winding 3 through electric valves 6–9, inclusive. The electric valves 6–9 are preferably of the type employing an ionizable medium such as a gas or a vapor and each includes an anode 10, a cathode 11 and a control member 12. To control the magnitude of the voltage of circuit 5 and hence to control an operating condition such as the speed of the induction motor 1, I provide a suitable arrangement such as an autotransformer 13 having windings 14 and 15 provided with a plurality of contacts 16 and 17, respectively. Controllable or adjustable contact-making mechanisms 18 and 19 are associated with contacts 16 and 17, respectively, to control or adjust the magnitude of the voltage of circuit 5. The transformer 13 may be connected to the alternating current circuit 4 or may be connected to any other suitable source of alternating current which is arranged to receive power from rotor winding 3.

In order to control the power factor at which power is transmitted from rotor winding 3 to circuit 4, I provide an excitation system 20 for electric valves 6–9. The excitation system 20 impresses suitable periodic voltages, such as alternating voltages, on control members 12 of electric valves 6–9, inclusive, to render these electric valves conductive in a predetermined order. Suitable sources of negative unidirectional biasing potential, such as batteries 21, 22 and 23, are connected in the excitation system 20 and current limiting resistances 24 may be connected in series relation with the control members 12. Any suitable phase shifting arrangement, such as a rotary phase shifting device 25, may be connected to the excitation circuit 20 through a transformer 21. The rotary phase shifter 25 permits adjustment of the power factor at which power is transmitted from rotor winding 3 to circuit 4.

The operation of the embodiment of my invention shown in Fig. 1 will be explained by considering the induction motor 1 when it is operating below synchronism. Under this condition, power will be transmitted from rotor winding 3 to circuit 4 through electric valves 6–9 and transformer 13. The electric valves 6–9 operate as a frequency changer to effect this power transfer. The speed of the induction motor 1 may be controlled by controlling the voltage of circuit 5; and the voltage of circuit 5 may be controlled by the contact mechanisms 18 and 19.

When the contact controlling mechanisms 18 and 19 are in positions 18′ and 19′, the speed of the induction motor 1 will be minimum since the opposing voltage against which the electric valves 6–9 act is maximum. On the other hand, when the contact controlling mechanisms 18 and 19 are in positions 18″ and 19″, the opposing voltage against which electric valves 6–9 act is minimum, and the speed of the induction motor 1 is maximum. Of course, for intermediate positions of the contact controlling mechanisms 18 and 19, the speed of the induction motor 1 assumes corresponding intermediate values.

Referring more particularly to the operation of the electric valves 6–9, during half cycles of one polarity of rotor voltage, power is transmitted from rotor winding 3 to circuit 4 through electric valves 6 and 8 which conduct current alternately; and during half cycles of opposite polarity of rotor voltage, power is transmitted to circuit 4 through electric valves 7 and 9 which conduct current alternately. Of course, the conductivities of electric valves 6–9 are controlled by the excitation circuit 20 so that this power transfer is effected in accordance with the voltage of circuit 4.

It is to be understood that the speed of the induction motor 1 may be controlled either by the adjustment of the contact controlling mechanisms 18 and 19 or by the adjustment of the rotary phase shifter 25. Furthermore, the speed of the induction motor 1 may be controlled by adjustment of the contact controlling mechanisms 18 and 19, and the rotary phase shifter 25 may be adjusted to produce a desired power factor condition for the machine 1. In other words, it is possible to obtain the desired speed of the induction motor 1 when using an adjustment of the rotary phase shifter 25 which will give a good power factor of machine 1.

In Fig. 2 of the accompanying drawings, there is shown another embodiment of my invention as applied to a control system for an induction motor having a quarter phase rotor winding. The arrangement of Fig. 2 is similar in many respects to that of Fig. 1 and corresponding elements have been assigned like reference numerals. An induction motor 26 having an inducing or stator winding 27 is connected to circuit 4 and is provided with a quarter phase rotor winding 28. Electric valves 29—36 are connected between circuit 5 and rotor windings 28 to act as a frequency changer to effect transfer of energy therebetween. The electric valves 29—36 are preferably of the type employing an ionizable medium and each includes an anode 37, a cathode 38 and a control member 39. A suitable excitation circuit (not shown) may also be associated with electric valves 29—36 to control the conductivities of these valves and hence to control the power factor at which power is transmitted to or received from rotor winding 28.

The operation of the embodiment of my invention shown in Fig. 2 is substantially the same as that explained above in connection with the arrangement of Fig. 1. The speed of the induction motor 26 may be controlled by operation of the contact controlling mechanisms 18 and 19 to control the voltage of circuit 5. The conductivities of electric valves 29—36 may also be controlled to control independently the power factor of induction motor 26.

Fig. 3 of the accompanying drawings diagrammatically illustrates another embodiment of my invention as applied to an electric valve system for controlling the speed of an induction motor 40, which may have a three-phase inducing or stator winding 41 and a three-phase induced or rotor winding 42. The stator winding 41 is connected to a suitable source of alternating current 43. To control the speed of the induction motor 40 from standstill to speeds above synchronism, I provide a variable voltage alternating current circuit 44. Electric valve means 45—62 are connected between circuit 44 and rotor windings 42 to transmit energy or power in both directions therebetween. The electric valves 45—62 are preferably of the type employing an ionizable medium and each comprises an anode 63, a cathode 64 and a control member 65. Current smoothing inductances 66 may be connected between circuit 44 and electric valves 45—62.

As an agency for controlling the voltage of circuit 44 to control the speed of induction motor 40, I provide a suitable arrangement such as a variable voltage alternating current machine 67 which may be of the synchronous type having a stator winding 68 connected to circuit 44 and having a field or excitation winding 69. The excitation winding 69 may be energized from a suitable source such as an exciter 70 which may be mechanically coupled to the synchronous machine 67.

The synchronous machine 67 may be mechanically coupled to a dynamo-electric machine 71 to permit the transfer of power in either direction between circuit 44 and rotor windings 42 of induction motor 40. The machine 71 may be of the induction type having a stator winding 72 and a rotor winding 73. It is to be understood that the machine 71 may be of the synchronous type, if desired. Stator winding 72 of machine 71 may be connected to any suitable alternating current circuit which is capable of receiving and supplying power in the form of alternating current. In the arrangement of Fig. 3, stator winding 72 of machine 71 is shown as being connected to alternating current circuit 43.

A plurality of excitation circuits 74—91 are associated with electric valves 45—62 to impress on the control member 65 suitable periodic voltages to control the electric valves as a frequency changer so that power may be transmitted in either direction between rotor windings 42 of induction motor 40 and circuit 44. Each of the excitation circuits 74—91 includes a transformer, a suitable source of negative unidirectional biasing potential such as a battery and a current limiting resistance. For example, excitation circuit 74 includes a transformer 74a, a battery 74b and a current limiting resistance 74c.

In order to control the energization of excitation circuits 74—91 conjointly in accordance with an operating condition or an electrical characteristic of induction motor 40 and in accordance with the voltage of alternating current circuit 44, I employ a control circuit 92 disclosed and broadly claimed in U. S. Letters Patent No. 2,213,945 granted September 10, 1940 and which is assigned to the assignee of the present application. In order to introduce into the excitation circuits 74—91 components of voltage, such as alternating voltages, which vary in accordance with the voltage of circuit 44, I employ a transformer 93 having primary windings 94 and secondary windings 95 provided with an electrical neutral connection 96. Any suitable phase shifting arrangement, such as a rotary phase shifter 93', may be interconnected between circuit 44 and transformer 93 to adjust the phase position of these components of alternating voltage introduced in excitation circuits 74—91.

To obtain an electrical quantity, such as an alternating voltage, which varies in accordance with an operating condition, such as the speed of induction motor 40, I provide an auxiliary or pilot alternating current generator 97 which may be mechanically coupled to the induction motor 40. The pilot generator 97 comprises armature windings 98 and a field winding circuit 99. Due to the fact that the pilot generator 97 is directly connected to induction motor 40, the frequency of the output voltage thereof will vary in accordance with the speed of motor 40 and the voltage produced by the pilot generator is introduced in excitation circuits 74—91 through a transformer 100 and transformer 93. The transformer 100 is provided with primary windings 101 and the secondary windings 102 having an electrical neutral connection 103. Neutral connection 96 of transformer 93 is connected to neutral connection 103 of transformer 100 so that the voltage components provided by these transformers act in series relation and impress on excitation circuits 74—91, and hence impress on associated control members 65, a voltage of beat frequency. Secondary windings 95 and 102 of transformers 93 and 100, respectively, are connected to excitation circuits 74—91 in a manner to permit the transfer of power in either direction between rotor windings 42 and circuit 44'. Of course, the frequency of the envelope of the beat voltage is at all times equal to the slip frequency of the induction motor 40, or, in other words, equal to the frequency of the current in the rotor windings 42. A suitable phase shifting arrangement, such as a rotary phase shifter 104, may be interposed between the pilot generator 97 and the transformer 100 to control the phase displacement between the components of voltage provided by transformers 93 and 100 and thereby control the power factor of the current in the rotor windings 42.

Rotary phase shifters 93' and 104 permit independent control of the power factor of the induction motor 40 and the speed of the induction motor 40 is independently controllable by control of the excitation of the synchronous machine 67.

The general principles of operation of the embodiment of my invention shown in Fig. 3 will be explained by considering the system when the induction motor 40 is operating below synchronism. Under this condition of operation, power is transmitted from the rotor windings 42 to circuit 43 through electric valves 45—62 and through synchronous machine 67 and machine 71. When power is flowing in this direction, the synchronous machine 67 operates as a motor and the induction machine 71 acts as an induction generator. The control circuit 92, acting in conjunction with excitation circuits 74—91, controls the conductivities of electric valves 45—62 so that these electric valves operate as a frequency changer to permit the transfer of power synchronously between induction motor 40 and synchronous machine 67. More specifically, under this condition of operation, the electric valves 74—91 operate as a rectifier relative to the rotor voltage of motor 40 and act as an inverter relative to the voltage of circuit 44.

A detailed description of the manner in which the excitation circuit 74—91 and the control circuit 92 operate may be found in my above identified copending patent application. Briefly described, the resultant control voltages impressed on excitation circuits 74—91 are of a beat frequency established by the difference of the alternating component produced by transformer 93 and the alternating component produced by pilot generator 97.

If it be assumed that the induction motor 40 is operating below synchronism and that it is desired to increase the speed of the induction motor 40, this control may be effected by decreasing the voltage of the variable voltage alternating current circuit 44. Of course, the voltage of circuit 44 may be decreased by decreasing the excitation of the synchronous machine 67. In this manner the opposing voltage against which the electric valves 45—62 operate is reduced, permitting a greater current to flow in rotor windings 42 and in this manner effecting an increase in speed of motor 40. On the other hand, if it is desired to decrease the speed of the induction motor 40, the excitation of the synchronous machine 67 may be increased effecting thereby a decrease in the current in rotor windings 42.

The power factor at which power is transmitted between rotor windings 42 and circuit 43, and hence the power factor of the induction motor 40, may be controlled independently by adjustment of rotary phase shifters 93' and 104.

The embodiment of my invention shown in Fig. 3 is capable of controlling the speed of induction motor 40 from standstill to speeds above synchronism. The induction motor 40 may also be operated at synchronous speed, since the pilot generator 97 provides a control voltage at all times. If it is desired to increase the speed of the induction motor 40 to synchronous speed or above, the direction of power transfer between circuit 44 and the rotor windings 42 is reversed. More specifically, the synchronous machine 67 then operates as a generator and the electric valves 45—62 operate as a rectifier relative to the voltage of circuit 44, and as an inverter relative to the voltage of rotor windings 42. At synchronous speed unidirectional current is transmitted to rotor windings 42 so that the induction motor 40 at synchronous speed operates substantially as a synchronous machine. For operation above synchronous speed, power is transmitted from circuit 43 to rotor windings 42 through machine 71 which acts as a motor to drive the synchronous machine 67 which in turn operates as a generator. The speed of the induction motor 40 may be controlled above synchronism by controlling the excitation of the synchronous machine 67. As the excitation of the synchronous machine 67 is increased for operation above synchronism, the power transferred to the rotor windings 42 is increased and hence the speed of the induction motor 40 is also increased.

The rotary phase shifters 93' and 104 may be controlled independently, either manually or automatically, to control the power factor of the induction motor 40. More particularly, the rotary phase shifters 93' and 104 may be adjusted to control the power factor independently of the variation of the voltage of circuit 44. It is to be noted that the speed of the induction motor 40 may be controlled either by adjustment of the control circuit 92 or by adjustment of the voltage of circuit 44. The field strength of the alternating current machine 67 may be varied so that it is possible to obtain the desired speed of the induction motor 40 when using an adjustment of the grids of the mutator which will give a good power factor.

An important feature of my invention is the manner in which the speed of the induction machine may be controlled by the employment of electric valve means without imposing on the associated supply circuit 43 a disproportionately low power factor condition. This improvement is obtained by virtue of the variable voltage feature of the alternating current circuit 44, which permits control of the voltage by means other than control of the conductivities of the electric valves.

In Fig. 4 of the accompanying drawings there is diagrammatically shown another embodiment of my invention which is similar in many respects to that shown in Fig. 3, and corresponding elements have been assigned like reference numerals. To control the voltage of circuit 44 and hence to effect control of the speed of induction motor 40, I provide an auxiliary alternating current machine 105 which is mechanically coupled to the rotating member of induction motor 40. The auxiliary machine 105 is of the synchronous type and comprises armature windings 106 and a field or excitation winding 107 which may be energized from any suitable circuit 108. Armature windings 106 may be connected to circuit 44 through a transformer 109 having primary windings 110 and secondary windings 111. The excitation circuits for electric valves 45—62 may be of the type shown in Fig. 3.

The operation of the embodiment of my invention shown in Fig. 4 is substantially the same as that explained above in connection with Fig. 3. The speed of the induction motor 40 may be controlled from standstill to speeds above synchronous speed by controlling the voltage of circuit 44 and by proper adjustment of the excitation circuits for valves 45—62. Below synchronism, power is transferred from rotor windings 42 through electric valves 45—62 to the machine 105 which acts as a motor and which assists the rotating member of motor 40. Under this condition of operation, electric valves 45—62 operate as a rectifier relative to the voltage of rotor windings 42, and operate as an inverter relative to the voltage of armature windings 106 of machine 105. By controlling the excitation circuit 108, the speed of motor 40 is controllable at will. Above synchronism, the auxiliary machine 105 acts as a generator to transmit power to rotor windings 42 through electric valves 45—62. When operating in this manner, the electric valves act as a rectifier relative to the voltage of armature windings 106 of machine 105, and act as an inverter relative to rotor windings 42 of motor 40. Of course, the motor 40 may operate at synchronous speed in the manner explained above in connection with Fig. 3. By controlling the conductivities of electric valves 45—62, the power factor of the induction motor 40 may be controlled independently.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current circuit, an induction motor including inducing and induced windings, said inducing winding being connected to said circuit, a second alternating current circuit, electric valve frequency changing means connected between said induced winding and said second circuit for transmitting power therebetween, said electric valve frequency changing means having a control member for controlling the current transmitted thereby, an alternating current machine mechanically coupled to said motor and comprising armature and excitation circuits, said armature circuit being connected to said second circuit, means for impressing on said control member a voltage which varies in response to the speed of said motor, and means for controlling the armature voltage of said alternating current machine to control an electrical characteristic of said motor.

2. In combination, an alternating current circuit, an induction motor having inducing and induced windings, said inducing winding being connected to said circuit, a second alternating current circuit, electric valve frequency changing means connected between said induced winding and said second circuit for transmitting power therebetween, said electric valve frequency changing means having a control member for controlling the current conducted by said electric valve frequency changing means, an alternating current machine of the synchronous type mechanically coupled to said motor and comprising armature and excitation circuits, said armature circuit being connected to said second circuit, means for impressing on said control member a voltage which varies in response to the speed of said induction motor and means for controlling the energization of said excitation circuit to control the speed of said motor.

3. In combination, an alternating current circuit, an induction motor having inducing and induced windings, said inducing winding being connected to said circuit, a second alternating current circuit, electric valve frequency changing means connected between said induced winding and said second circuit for transmitting power therebetween, said electric valve means having a control member for controlling the power transmitted between said induced winding and said second circuit, an alternating current dynamo-electric machine of the synchronous type mechanically coupled to said motor and comprising an armature winding and a field winding, said armature winding being connected to said second circuit, means for impressing on said control member a voltage which varies in accordance with the speed of said motor, and means for controlling the energization of said field winding to control the speed of said motor.

4. In combination, an alternating current circuit, an induction motor having inducing and induced windings, said inducing winding being connected to said circuit, a second alternating current circuit, electric valve frequency changing means connected between said induced winding and said second circuit for transmitting power therebetween, said electric valve means having a control member, an alternating current dynamo-electric machine of the synchronous type mechanically coupled to said motor and comprising an armature winding and an excitation circuit, said armature winding being connected to said second circuit, means for impressing on said control member a periodic voltage to obtain power transfer from said induced winding to said armature winding, and means for controlling the energization of said excitation circuit to control the speed of said induction motor.

ERNST F. W. ALEXANDERSON.